MEANS FOR CONVERTING A FIRST INFORMATION INTO AN UNEQUIVOCAL SECOND INFORMATION

Original Filed Aug. 23, 1963 3 Sheets-Sheet 1

3,370,290
MEANS FOR CONVERTING A FIRST INFORMATION INTO AN UNEQUIVOCAL SECOND INFORMATION

Heinz Mertel, Hohenschaftlarn, and Hartmut Gebhardt, Grosshesselohe, Germany, assignors to Siemens Aktiengesellschaft, a corporation of Germany Continuation of abandoned application 304,148, Aug. 23, 1963. This application Nov. 15, 1966, Ser. No. 594,631
Claims priority, application Germany, Aug. 30, 1962, S 81,176
3 Claims. (Cl. 340—347)

ABSTRACT OF THE DISCLOSURE

This invention relates to means for the translation of a first information, represented by always 1 of *m* information elements in *x* groups, into a second information. When practicing the invention this can be done, for example, when using magnetic core storage by reversing the magnetization of a core combination in a magnetic core array by means of wires threaded through the array, which wires during the translation operation are always individually controlled. The hysteresis loop of the material of the magnetic cores is preferably rectangular.

Figure 1:
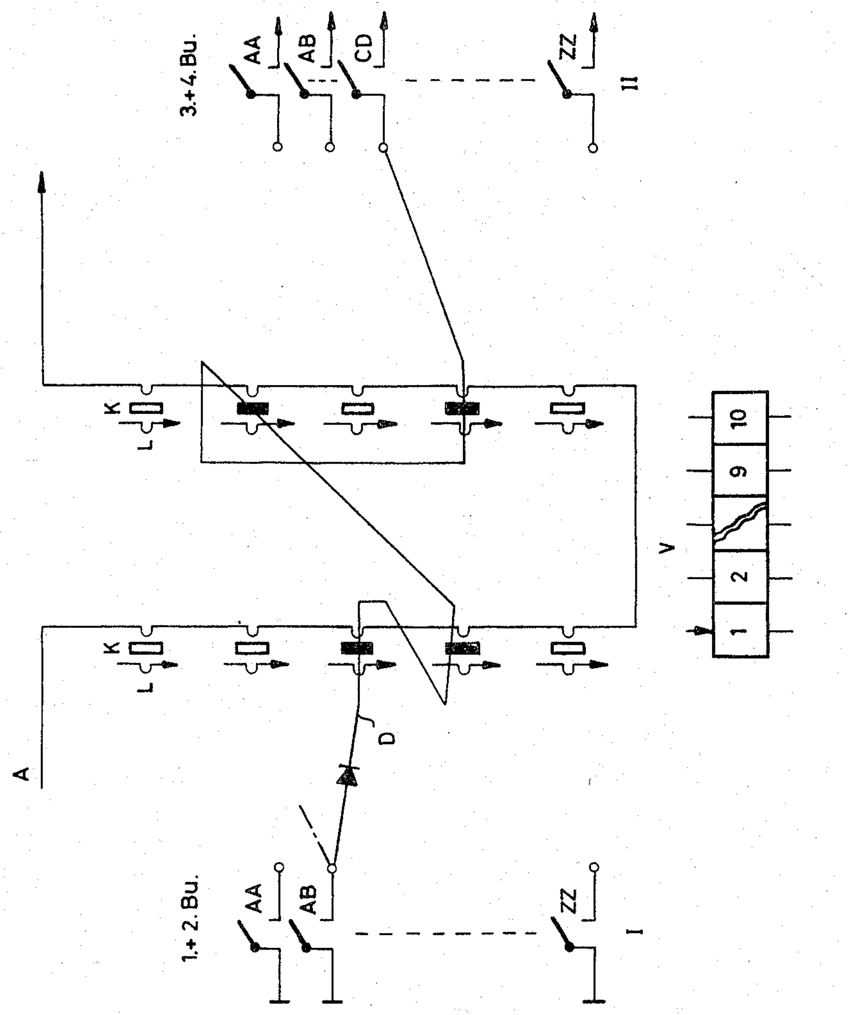

This application is a continuation of application No. 304,148 filed Aug. 23, 1963 and now abandoned.

The device consists of separating from the first information a part that is represented by the $x-k$ groups and of magnetizing a plurality (that is, more than one) of core combinations belonging to this part in one direction by means corresponding to this part of the first information. By means of the remainder of the first information, represented by the *k* groups, that core combination is determined which represents the second information corresponding to the complete first information, while means, as determined by the remainder of the first information, is simultaneously used for interrogation, and only that core combination representing the second information corresponding to the complete first information is remagnetized in the original direction, whereupon the second information is removed from storage in an unequivocal form. In the embodiment to be described, employing the device of the invention, the aforesaid control means are individual wires.

It is an object of the invention to obtain a method for the translation or conversion of a first information into an unequivocal second information, which method is simply practiced and permits easily changing the correspondence between the first and the second informations, even though the first be composed of a large number of groups.

Another object of the invention is means for effecting the method of the invention, which means is considerably simpler and less costly than prior art embodiments for converting a first information into an unequivocal second information.

Figure 2:
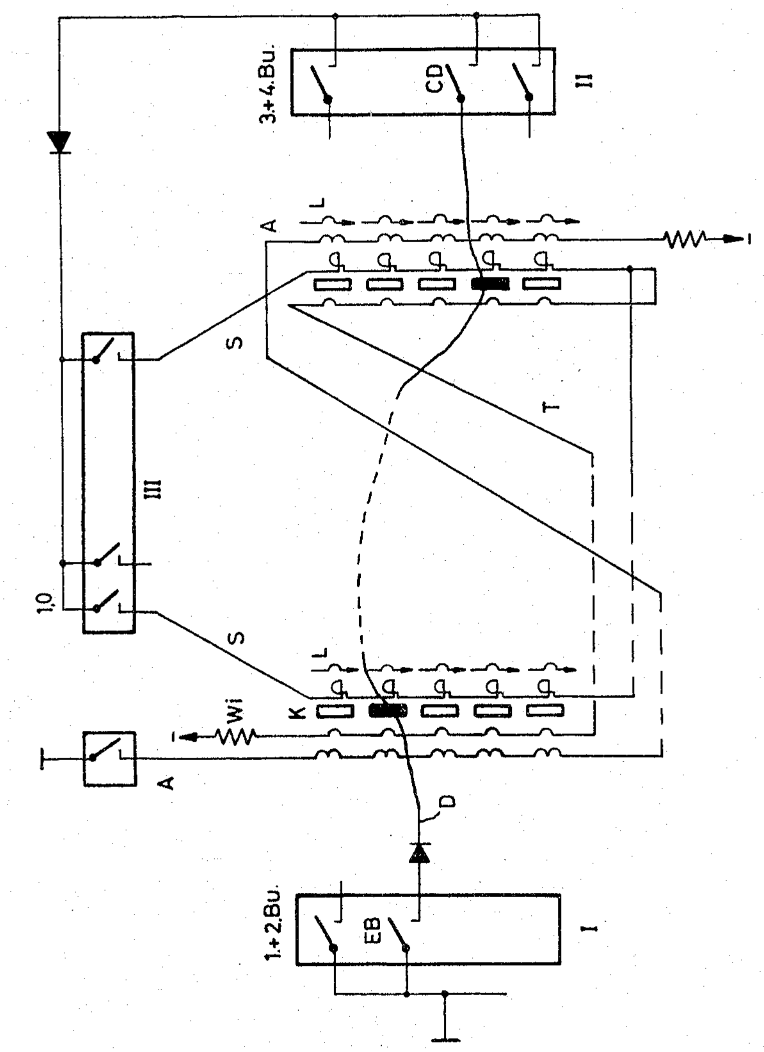

These and other objects of the invention will be apparent from the following detailed description, offered by way of example and not in limitation thereof, and with reference to the drawing, in which:

FIGURES 1 and 2 schematically show two embodiments of the prior art, and

Figure 3:
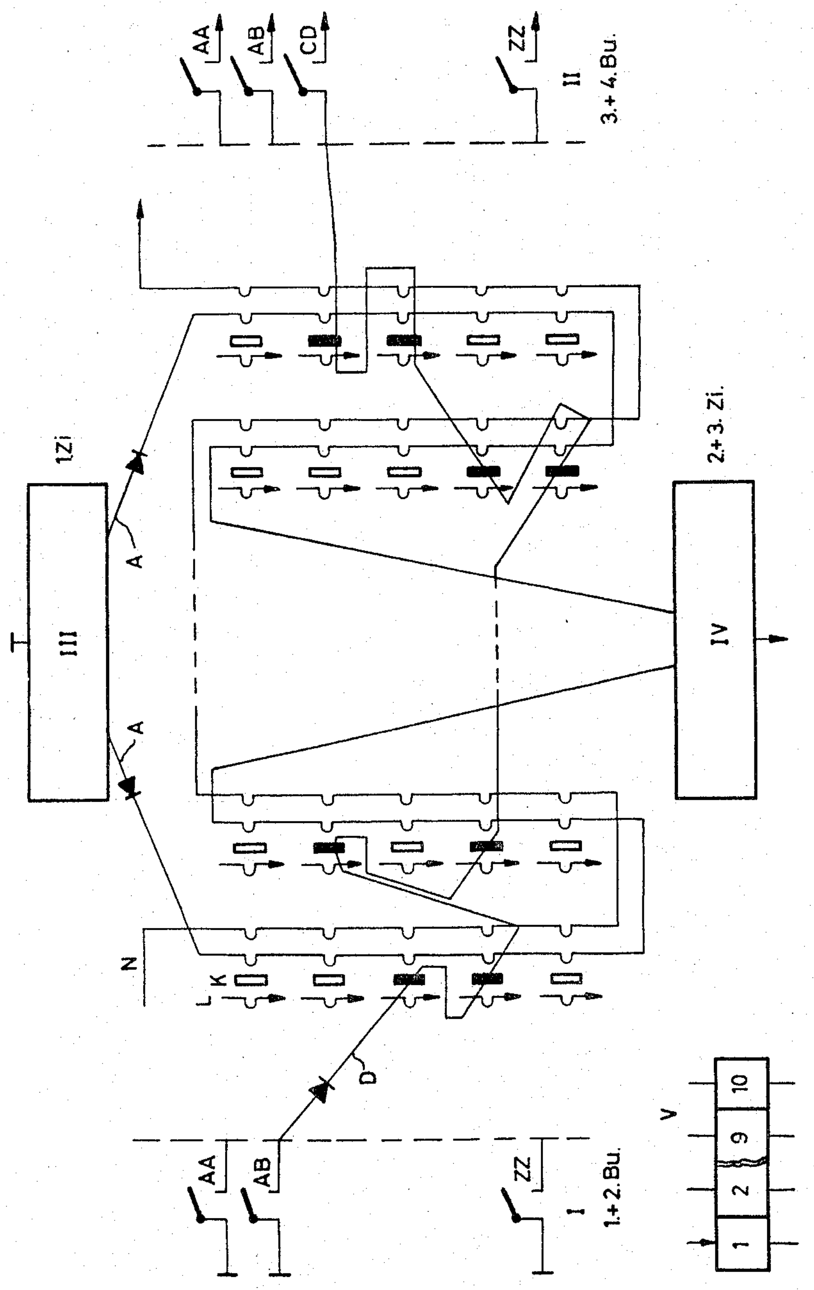

FIGURE 3 schematically shows an embodiment employing the device of the invention.

The explanation of the invention will be pursued by way of the prior art, whereby the operation, as well as the advantages, of the invention more readily will be grasped.

The conversion or translation of a first information, represented by always 1 of *m* elements of information in *x* groups, into a second information is known in the technique of magnetic cores. The manner in which this is accomplished is that during the write operation, for the selection of a core in a core array, only one information element of each group is used, and only that one core in the 1 state has the direction of its magnetization reversed. During the subsequent interrogation of the core array only those cores in the 1 state provide a voltage while returning to the zero state. In the read wires of the magnetized cores a read signal is produced, with the help of which the desired second information can be formed.

For electrical reasons such switching arrangements are necessary, for example, with calculating and accounting machines, where the given value first must be converted into another value, with which the machine can work. They are also advantageous in automatic letter sorting, where an indication of the destination is to be obtained from a plurality or group of letters for the place of destination of the piece of mail, which letters are chosen according to a definite principle. This given group of letters—ABCD, for example, where each letter of the group is an element of the information—constitutes the first information, which is converted or translated to a code number—96, for example: the code number of the postman—constituting the second information. In this conversion operation it is also possible to change the correspondence of ABCD; that is to say, ABCD can be converted, say, to the code number 102, rather than to 96, in which case another letter group, say ABCC, would or might correspond to the code number 96. In certain instances the changing of the threading of the wires through the cores in order to effect this change in correspondence poses a difficult problem.

It has been suggested that this problem of changing the correspondence be solved by switching to the other second information (that is, in the instance of ABCD, not to 96 but to 102), using only a single switching wire for controlling the individual information elements, necessary to the combination result, of the information. The individual elements of the first information are divided into two groups, and the switching wire connects all of the elements together. This solution is shown in FIGURE 1, wherein a four letter combination, constituting the first information and selected in accordance with a definite principle from a postal address is converted into an associated code number constituting the second information. For example, on the principle that the first, third, fifth, and eighth letters selected from the name of the street designate that street, we have, in the case of a hypothetical thoroughfare named NiEtZscHe Street, the four letter combination NEZH constituting the first information.

Referring to FIGURE 1, the first two letters are associated with a switch in a switching array I having 20×20 or 400 switches and the third and fourth letters with a switch in a second, equally large switching array II. The number 20 results from the use of only 20 letters of the alphabet. The result array is shown between the two switching arrays and consists of bistable elements, such as, for example, ten ferrite ring cores K, which can form, for example, a two digit decimal result in the form of a 2 (2 out of 5) code as the second information.

For example, if the combination ABCD is to be converted into 86, then the switch, assigned to the subcombination AB, of array I and the switch, assigned to the subcombination CD, of array II are connected together, whereby a current, flowing from the one switch to the other through wire D and its diode, writes the desired number combination in the result array in the form of a 2 (2 out of 5). The diode is necessay to prevent multiple switching.

A subsequent interrogation pulse over wire A withdraws from storage the second information written in the result array, whereby a read signal is produced in four read wires L and amplified by the amplifiers V of the result output. This kind of conversion or translation assures a simple switching for changing the information, since for one result only one write wire, between the two switching arrays I and II, must be connected to other switches or threaded through other cores, according to whether the first or the second information is to be changed.

In this known example, it is possible, because of the input to the customary individual elements of the first information, that an unequivocal combination result as second information cannot be obtained. For example, this is the case with an accounting machine used for air travel and handling air routes that are flown by several air lines. The possibility of coming upon a magnetic core not associated with an unequivocal output, however, also, among other examples, exists in switching technique, where a telephone subscriber can be reached by several different paths, and not least of all in the field of letter sorting, where one street is divided among several postmen. In all of these cases, in which the input elements of the information do not suffice for forming the result, an additional criterion must be added to the first information. Using the example taken from letter sorting, in order to obtain an unequivocal result a group of three digits of the house number is added to the group of four letters already referred to. These two groups are then used to obtain a definite result. For example, from ABCD 106—where ABCD (the first part of the first information) is the code for a particular street and 106 (the second part of the first information) is the house number—the code number 1003 is obtained (the second information), identifying the postman serving the address. With this scheme the number of different combinations and the number of switches substantially increases. In order easily to change the correspondence of the first information, it is necessary to have a large number of switches, which latter may comprise each a magnetic core and a transistor.

When, further, the first information consists of a core combination composed of a considerable number of groups and only one write wire belongs to each combination, as in the embodiment of FIGURE 1, one is faced with eventual difficulties when changing the correspondence of the first information, because of the large number of wires. Since on technical grounds and for reasons of assembly only a limited number of wires can be threaded through the cores, so that to increase the number of write wires more result core arrays would have to be provided in a parallel spatial arrangement, there would at the same time be a substantial increase in the number of cores for the result.

It has already been suggested to use not only the first and second coordinates but also the third and fourth for writing, whereby during the write operation there is obtained an unequivocal result which at some later time can be interrogated. This suggestion, which also comes from the field of letter sorting, is shown in FIGURE 2. The first and second letters are asociated with a switch array I and the third and fourth with a switch array II. The number group consisting of the house number is represented by a switching array III. Between these switches is the result array, consisting of an array of ring cores for forming the second information in codified form. An interrogation winding A and a read winding L pass through each of the cores K of the array field. One write wire per result array from switching array III and an inhibit winding T common to all core arrays likewise pass through every core of the result array. The inhibit winding is connected through a working resistance Wi to a negative voltage. The interrogation must be specially controlled, because, for appropriate reasons, not all cores can be, all at once, interrogated.

Upon closing switches EB, CD, and 1.0 in the switching arrays I, II, and III, a current, which is of the same strength as that in the write winding S in the left result array and identical to that in the inhibit winding T threaded through all of the cores, flows through wire D connected to a diode, the function of which, as noted in the previous embodiment, is to prevent multiple switching. Thus, it is possible to write information in only one core, array, this being, in the embodiment of FIGURE 2, in the left core array in the core second from the top. The inhibit winding prevents writing in any of the other cores.

The embodiment of the invention shown in FIGURE 3 also arises from the field of letter sorting. In this figure, the first and second characters Bu are identified with a switching array I and the third and fourth characters Bu with the switching array II. These two arrays represent the $x$–$k$ groups. The number groups, indicated as 1 to 3 Zi, are represented by the $k$ groups of the first information and consist of the house numbers. They are used for interrogation through switching arrays III and IV, with which they are associated. Arrays III and IV, therefore, represent the $k$ groups. It will be understood that, although only one of the two arrays III and IV is necessary, the use of two arrays reduces the number of switches required for a given number of combinations. In the middle, between these switches, is the result arrays, consisting of a plurality of bistable switching means or cores that can, for example, be ring cores, for the formation of the second information in codified form. An interrogation winding A, a read winding L, and a write winding D are threaded through each core of the result array. An erase wire N runs through all of the cores of all of the magnetic core arrays.

The mode of operation of the switching arrangement of the invention now will be explained. In the $x$–$k$ groups the circuit of only two switches (for example, AB and CD) of arrays I and II is closed. The result combinations are thereby written, by means of wire D, in several core arrays, in this case two. By interrogating with the $k$ groups, which represent the remaining part of the first information, the desired result is interrogated over a wire A, by closing the proper switch in each of arrays III and IV corresponding to the second part of the first information, thereby "forming" the desired second information. Only that core or group of cores (here four) having the desired result is interrogated.

The read pulse produced in conducted by read wires L to read amplifiers V, amplified, and then led to a result output, not shown.

After the desired result has been formed for the second information, the residual information in the $n$ result arrays is erased by the windings of lead N, while the result output is simultaneously blocked. It will be understood that the actual number of result arrays depends on the number of addresses. The two arrays shown in the simple example of FIGURE 3 are each associated with a switching means in each of arrays III and IV, which latter consequently have two switches each. However, in practice each core or group of cores has an individual interrogation wire.

With regard to this example taken from the field of letter sorting, there is, practically speaking, no increase in the number of cores in accordance with the device of the invention; while, on the other hand, there is a substantial reduction in the number of switches—and consequently of transistors—thereby affording a substantial simplification and saving of money.

Moreover, applicants' invention has the particular advantage of dividing the first information into two parts, whereby only modifications or changes to the first part must be allowed for, while the second part can be permanently wired. In letter sorting, for example, the four letter combinations can be stored in the first part and the house numbers in the second.

Finally, with the device of the invention it is possible to use the *x–k* groups over a first and second coordinate for writing in a plurality of result arrays, and to use the *k* groups over a third, or a third and a fourth, coordinate for interrogating the desired result corresponding to the second information. This is impossible with the prior art embodiment of FIGURE 2, requiring, as already noted, the use of all of the coordinates during writing. Applicants' device is therefore faster and uses fewer switching means.

While there has been described what is considered to be the preferred embodiment and form of the device of the invention, it will be obvious to those skilled in the art that modifications can be made therein without departing from the invention; and the appended claims are intended to cover all such modifications as fall within the true scope and spirit of the invention.

The invention claimed is:

1. A device for converting a first information, represented by a plurality of information elements, into a second unequivocal information, comprising (a) a first plurality of switching devices selectively actuatable to produce a first signal representing a first part of the first information, (b) a second plurality of switching devices selectively actuatable to produce a second signal representing a second part of the first information, said first plurality of switching devices being actuatable independently of said second plurality of switches to permit formation of the desired first information, (c) a plurality of storage arrays each including a plurality of storage devices, (d) first means connecting each of said first switching devices to at least one of said storage devices in at least a pair of said plurality of said arrays, each of said storage devices being connected to a plurality of said first switching devices, (e) second means connecting a respective one of said said second switching devices to all of said storage devices in a respective one of said arrays, and (f) means for detecting a coincidence of said first signal and said second signal in said storage devices.

2. A device as defined in claim 1, wherein said second connecting means includes means for connecting a respective one of said second switching devices to all of said storage devices in all of said arrays and means for cancelling said second signal from all of the storage devices of all but said respective one of said arrays.

3. A device as defined in claim 1, further comprising means for cancelling said first signal from said storage devices of one of said storage arrays.

References Cited

UNITED STATES PATENTS

| | | | |
|---|---|---|---|
| 2,973,506 | 2/1961 | Newby | 340—147 |
| 2,984,823 | 5/1961 | Spencer | 340—172.5 |
| 3,086,198 | 4/1963 | Tate | 340—347 |
| 3,235,664 | 2/1966 | Ko Muroga | 179—18 |
| 3,241,117 | 3/1966 | Schottle | 340—153 |

MAYNARD R. WILBUR, *Primary Examiner.*

J. H. WALLACE, *Assistant Examiner.*